(12) United States Patent
Noldus et al.

(10) Patent No.: US 11,128,690 B2
(45) Date of Patent: *Sep. 21, 2021

(54) LOADING A WEB PAGE IN A TELECOMMUNICATION NETWORK USING AN ACCESS POINT SERVER

(71) Applicant: Telefonaktiebolaget LM Ericsson (publ), Stockholm (SE)

(72) Inventors: Rogier August Caspar Joseph Noldus, Goirle (NL); Lars Lövsén, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,471

(22) Filed: Aug. 14, 2019

(65) Prior Publication Data

US 2019/0373044 A1 Dec. 5, 2019

Related U.S. Application Data

(63) Continuation of application No. 15/102,177, filed as application No. PCT/EP2013/077391 on Dec. 19, 2013.

(51) Int. Cl.
*H04L 29/08* (2006.01)
*H04L 29/12* (2006.01)
(Continued)

(52) U.S. Cl.
CPC .......... *H04L 67/02* (2013.01); *H04L 61/2007* (2013.01); *H04L 61/305* (2013.01);
(Continued)

(58) Field of Classification Search
CPC ..... H04L 67/02; H04L 67/42; H04L 63/1441; H04L 63/1483; H04L 63/0428;
(Continued)

(56) References Cited

U.S. PATENT DOCUMENTS 6,253,234 B1 6/2001 Hunt et al.
7,360,210 B1 4/2008 Vacanti et al.
(Continued)

FOREIGN PATENT DOCUMENTS

| CN | 103220371 A | 7/2013 |
|---|---|---|
| EP | 1164749 A1 | 12/2001 |
| WO | 02086786 A2 | 10/2002 |

OTHER PUBLICATIONS

Fileding, R., et al., "Hypertext Transfer Protocol—HTTP/1.1", Network Working Group Request for Comments: 2616, Jun. 1, 1999, pp. 1-177, The Internet Society.
(Continued)

*Primary Examiner* — Djenane M Bayard
(74) *Attorney, Agent, or Firm* — Coats & Bennett, PLLC

(57) ABSTRACT

An internet protocol (IP) access point sends, to a requesting device, a modified version of a first web page comprising first modifications made in accordance with policy handling information, and receives, from the requesting device, a request for a second web page. Responsive to detecting that the request for the second web page comprises one or more of the first modifications, the IP access point sends a modified version of the second web page comprising second modifications made in accordance with the policy handling information to the requesting device.

24 Claims, 5 Drawing Sheets

(51) Int. Cl.
*H04W 88/02* (2009.01)
*H04L 29/06* (2006.01)
*H04W 12/08* (2021.01)
*H04L 12/14* (2006.01)
*H04M 15/00* (2006.01)
*H04W 4/24* (2018.01)
*H04W 88/16* (2009.01)

(52) U.S. Cl.
CPC .......... *H04L 63/0428* (2013.01); *H04L 63/08* (2013.01); *H04L 63/1433* (2013.01); *H04L 63/20* (2013.01); *H04L 67/2804* (2013.01); *H04L 67/2819* (2013.01); *H04W 12/08* (2013.01); *H04W 88/02* (2013.01); *H04L 12/1496* (2013.01); *H04M 15/66* (2013.01); *H04M 15/8083* (2013.01); *H04W 4/24* (2013.01); *H04W 88/16* (2013.01)

(58) Field of Classification Search
CPC . H04L 67/2823; H04L 67/2842; H04L 67/32; H04L 43/08; H04L 63/123; H04L 63/145; H04L 67/2852; H04L 63/08; H04L 63/1416; H04L 63/1425; H04L 63/168; H04L 67/14; H04L 67/18; H04L 67/22; H04L 67/322; H04L 12/1496; H04L 2463/144; H04L 63/0471; H04L 63/1433; H04L 63/20; H04L 67/1002; H04L 67/2804; H04L 67/2814; H04L 67/34; H04L 69/22; H04L 41/069; H04L 41/50; H04L 61/2007; H04L 61/305; H04L 67/2819; H04L 61/1511; H04L 63/0281; H04L 63/102; H04L 63/1458; H04L 67/28; H04L 63/1466; H04L 63/0236; H04L 61/6013; H04L 67/146; H04L 69/40; H04L 29/12066; H04L 63/083; H04L 47/745; H04L 51/22; H04L 63/0245; H04L 63/0254; H04L 63/0861; H04L 63/126; H04L 65/80; H04L 63/0272; H04L 65/601; H04L 61/609; H04L 63/061; H04L 63/062; H04L 63/0876; H04L 65/1069; H04L 67/10; H04L 12/06; H04L 12/6418; H04L 63/0209; H04L 63/065; H04L 63/0823; H04L 63/1408; H04L 67/1046; H04L 67/125; H04L 67/26; H04L 9/0866; H04W 12/08; H04W 88/02; H04W 88/16; H04M 15/66

See application file for complete search history.

(56) References Cited

U.S. PATENT DOCUMENTS

| | | |
|---|---|---|
| 2003/0149581 A1 | 8/2003 | Chaudhri et al. |
| 2005/0049980 A1 | 3/2005 | Volk |
| 2009/0031006 A1 | 1/2009 | Johnson |
| 2009/0307750 A1* | 12/2009 | Marueli .................. G06F 21/62 726/3 |
| 2012/0010995 A1 | 1/2012 | Skirpa et al. |
| 2015/0193117 A1 | 7/2015 | Nicolaou et al. |
| 2016/0072847 A1* | 3/2016 | Bremen .............. H04L 63/0236 726/1 |

OTHER PUBLICATIONS

Everts, T., "Rules for Mobile Performance Optimization", An overview of techniques to speed page loading, Communications of the ACM, Aug. 1, 2013, pp. 52-59, vol. 56, No. 8, ACM.

Nicolaou, A., "Best Practices on the Move: Building Web Apps for Mobile Devices", Communications of the ACM, Aug. 1, 2013, pp. 45-51, vol. 56, No. 8, ACM.

* cited by examiner

LOADING A WEB PAGE IN A TELECOMMUNICATION NETWORK USING AN ACCESS POINT SERVER

RELATED APPLICATIONS

This application is a continuation of prior application Ser. No. 15/102,177, filed 6 Jun. 2016, which was the National Stage of International Application PCT/EP2013/077391 filed 19 Dec. 2013, the entire disclosure of each being hereby incorporated by reference herein.

TECHNICAL FIELD

The present invention generally relates to the loading of a web page and, more specifically, to the handling of requests for retrieving content of the web page, by an internet protocol access point server, such as a Gateway GPRS Support Node or a Packet Data Gateway.

BACKGROUND

A User Equipment, UE, connects to an Internet Protocol, IP, access point server in a telecommunication network for establishing Internet Protocol, IP, connectivity. Such an access point server may include any of a Gateway General Packet Radio Service, GPRS, Support Node for GPRS for third Generation access, or a Packet Data Network Gateway in the case of Evolved Packet system access.

The IP access point server is responsible for different types of policy handling, such as, amongst other, IP address assignment, authentication and charging functions, packet routing and transfer, mobility management and logical link management for its connected user equipment.

Internet Protocol packets from the User Equipment are routed via the IP access point server as the primary access point for connecting to the telecommunication network. When the IP access point server intends to apply a policy handling for IP packets related to different IP services, the access point server may base such determination on either the application (HTTP, FTP, e-mail, Instant Message, etc.) of, or the destination address comprised in the IP packets.

Such a policy handling may relate to charging. An operator of a communication network may, for example, offer free access to certain information web pages. The IP access point server will then filter out IP packets comprising a destination web address corresponding to the web address of any of the information web pages, such that these IP packets are exempt from charging.

Generally, for the loading of a web page, a request for retrieving content of the web page is received by the IP access point server in the form of an initial HTTP Get transaction. Such initial Get transaction is followed by one or more subsequent Get transactions, depending on the result of the initial GET transaction. For example, the receipt of web page markup data from a web server hosting the web page, in response to an initial Get transaction and comprising one or more addresses to further web pages, results in subsequent requests directed to these further web pages for further content to be retrieved.

In practice, the above sketched situation may occur frequently, as often a requested web page will comprise content in the form of links to content on further web pages to be loaded along with the requested web page. An example hereof is advertisement content present on the requested web page. These further web pages are hosted on either a same web server or a different web server.

In the case the IP access point server intends to apply a policy handling for requests for loading a certain web page at a user equipment, the initial request as well as the corresponding subsequent requests should be processed as being qualified for policy handling. This, however, complicates the situation.

If the operator of the telecommunication network decides that a certain web page should qualify for policy handling, it is not sufficient for the IP access point server to base such a determination on the destination web address comprised in the IP packets received for loading the web page. Although the initial request may comprise the destination web address of the web page to be loaded, corresponding subsequent requests may be directed to different web pages, i.e. different web addresses.

In addition, the content of a web page may alter dynamically, and thus also the web addresses comprised in the web page markup data of a web page, making it more difficult for the IP access point server to determine that web addresses comprised in the subsequent requests should qualify for the same policy handling as the web address comprised in the initial request.

In order to mitigate the above mentioned issue, the prior art advocates that web pages should limit the number of embedded links to content on other web pages, thereby creating a so called "flat" web page, and that web pages should at least have a static content. These kinds of solutions are, however, undesirable, as it increases constraints for a web page or web server.

These constraints are related to, amongst other, data traffic of the web server and the possibility to dynamically alter the content. Data traffic of the web server hosting a web page having, for example, the linked content itself embedded in the web page instead of a link to the content on another web page, will increase due to the data size of the content. Further, in such a case, the linked content is less dynamic, as the web server of the web page controls its content instead of the web server from which the linked content originates.

SUMMARY

It is an object to provide an improved method for loading a web page at a user equipment, UE, in a telecommunication network. The telecommunication network comprises an Internet Protocol, IP, server and a web server hosting the web page, i.e. the telecommunication network provides access to the IP access point server and the web server.

It is another object to provide a Internet Protocol access point server for operation in a telecommunication network supporting the improved method.

It is a further object to provide a User Equipment, UE, arranged for operation in the telecommunication network supporting an improved method for loading a web page.

In a first aspect of the invention there is provided a method for loading a web page at a web page requester in a telecommunication network, wherein the telecommunication network comprises an internet protocol IP access point server and a web server hosting the web page.

The method comprises the steps of receiving a request, by the IP access point server, from the web page requester, for loading the web page, and determining, by the IP access point server, that the web page qualifies for web page loading policy handling, and retrieving from the web server, by the IP access point server, in response to the request, web page markup data relating to the web page, and providing, by the IP access point server, to the web page requester, the web page markup data and policy handling information relating to the web page loading policy handling, and processing, by the IP access point server, subsequent requests from the web page requester in accordance with the provided policy handling information for retrieving content at a web server for loading the web page.

In the following, the advantages of the present invention are explained with regard to a web page requester in the form of a User Equipment. However, the invention is also applicable to other types of web page requesters, such as, a machine-to-machine unit, a tablet, PC, etc.

The method is based on the insight that in case requests for loading a web page qualified for web page loading policy handling are received, the web page requester is to be provided with web page markup data as well as policy handling information relating to the web page such that corresponding subsequent requests for retrieving content, at another web page, for loading the web page also qualify for policy handling.

In such a case, a corresponding subsequent request is coupled to a preceding received request, for example an initial request, using the policy handling information, such that the IP access point server is able to determine that the subsequent request qualifies for the same web page loading policy handling as the preceding received request.

The advantage of the invention is that no constraints are imposed on the design of a web page, such as the number of embedded links, whether or not the web page may be dynamically altered, etc. As long as the policy handling information is provided to the UE, the IP access point server is able to determine that subsequent requests qualify for the same policy handling, irrespective of the design of the web page.

In the context of the present invention, web page loading policy handling is understood to be any of an IP address assignment, authentication and charging functions, packet routing and transfer, mobility management and logical link management for its connected user equipment, and in combination with requests for loading a web page.

In an example, the step of determining, by the IP access point server, that the web page qualifies for a web page loading policy handling, comprises determining that a web address of a web page comprised in the request qualifies for web page loading policy handling, and/or the step of processing, by the IP access point server, subsequent requests from the UE, comprises determining that the subsequent requests comprise policy handling information.

In the context of the present description and claims, a web address may be any of an Internet Protocol address, a host name address, a Uniform Resource Locator, URL, and a Uniform Resource Identifier, URI, etc.

The IP access point server may be arranged to determine whether the intended web page of the received request qualifies for policy handling using two different options. In a first option, a subsequent request is coupled to a previous request, at least for a web page qualified for web page loading policy handling, using the web page loading policy handling information. The IP access point server is then arranged to detect the web page loading policy handling information in that subsequent request to determine that the subsequent request qualifies for a same web page loading policy handling as the preceding request.

In a second option, a received request for loading a web page comprises a web address known to the IP access point server as being qualified for web page loading policy handling. For example, the IP access point server may maintain a lookup table having entries listing web addresses being qualified for policy handling. A web address comprised in a request received is then compared to the entries of the lookup table to determine that the web address qualifies for policy handling. Such a request can either be the initial request or a subsequent request, which subsequent request is triggered by receipt of web page markup data corresponding to the initial request.

The step of determining that a subsequent request comprises policy handling information may further comprise amending the subsequent request by removing the policy handling information and forwarding the amended subsequent request towards a web server comprising the content. This has the advantage that the functionality of subsequent servers or nodes in the chain, i.e. between the IP access point server and the web server, does not need to be altered.

In another example, policy handling information comprises any of at least one prefix to a web address comprised in the web page markup data for indicating that the web address qualifies for web page loading policy handling, or at least one parameter indicating that a web address comprised in the web page markup data qualifies for web page loading policy handling, or at least one indication that a web address comprised in the web page markup data is to be amended with either the at least one prefix and the at least one parameter for indicating that the web address qualifies for web page loading policy handling.

In an example, the step of retrieving from the web server, web page markup data relating to the web page comprises forwarding, by the IP access point server, the request towards the web server, wherein the request comprises an indication for policy handling information. The step further comprises receiving, by the IP access point server, the web page markup data relating to the web page and the policy handling information.

Different approaches are available to provide the UE with the web page markup data and the policy handling information. In a first approach, the web server is requested to provide the policy handling information to the IP access point server, which access point server, subsequently, provides the markup data and the policy handling information to the UE.

The URL's, i.e. the links, embedded in the requested web page may be amended during parsing of the web page, for example an HTML page. Parsing is a process that is usually performed offline, by or on behalf of the web server that hosts the web page. Parsing, in such a case, entails that all URL's embedded in the web page are amended with a parameter, such as a prefix.

Based on, or in a reply to the indication for policy handling information, the web server may provide web page markup data in the form of an adapted parsed HTML page comprising amended URL's to the further web pages, such that these amended URL's comprised in subsequent requests from a UE, may be detected by the IP access point server. These amended URL's may form the trigger for the IP access point server to determine that the subsequent requests are qualified for a web page loading policy handling.

It is regarded that in such a case a secure connection may have to be deployed between the web server and the IP access point in the telecommunication network. This ensures that the web server is able to authenticate the trustworthiness of the request.

To mitigate any risk for fraudulent use of the disclosed method, encryption of the policy handling information, for example web addresses in the requests, may be performed.

In yet another example, the step of providing, by the IP access point server, to the UE, the web page markup data and policy handling information comprises determining, by the IP access point server, that the retrieved web page markup data correspond to the request from the UE, and generating, by the IP access point server, the policy web page loading handling information.

In this second approach, the IP access point server may receive the web page markup data from the web server, and correlate the data with the request forwarded to the web server. In case of a match, the IP access point server may include the policy handling information in the received web page markup data, before the data is provided to the UE.

The advantage hereof is that the web server does not need to be modified to enable a method according to the present invention. The characterizing aspects of the invention are performed by the IP access point server, such that only this server needs to be updated.

In a further example, the step of processing, by the IP access point server, subsequent requests from the UE, comprises receiving a subsequent request, by the IP access point server, from the UE, for retrieving content of the web page, wherein the subsequent request comprises policy handling information, and determining, by the IP access point server, that a web address comprised in the subsequent request qualifies for a web page loading policy handling according to the policy handling information comprised in the subsequent request.

In a second aspect of the invention, an Internet Protocol, IP, access point server is provided, arranged for operation in a telecommunication network, wherein the telecommunication network further comprises a web server hosting a web page.

The IP access point server comprises a receiver operable to receive a request, from a user equipment, UE, for loading the web page, a determiner operable to determine that the web page qualifies for a web page loading policy handling, a retriever operable to retrieve from the web server, in response to the request, web page markup data relating to the web page, and a provider operable to provide, to the UE, the web page markup data and policy handling information relating to the web page loading policy handling;

The IP access point server further comprises a handler operable to process subsequent requests from the UE in accordance with the provided policy handling information for retrieving content at a web server for loading the web page.

In an example, the determiner is operable to determine that a web address of a web page comprised in the request qualifies for web page loading policy handling, and/or the handler is operable to determine that the subsequent requests comprise policy handling information.

In another example, the handler is further operable to amend the subsequent request by removing the policy handling information from the subsequent request.

The advantage hereof is that subsequent servers in the network between the web server and the IP access point server do not need to be modified, i.e. these servers may operate as usual.

In a further example, the retriever is further operable to forward the request towards the web server comprising an indication for policy handling information, and to receive the web page markup data relating to the web page loading policy handling and the policy handling information.

In yet another example, the provider is further operable to determine that said retrieved web page markup data correspond to said request from said UE, and to generate said policy handling information.

In yet a further example, the receiver is further operable to receive a subsequent request, from the UE, for retrieving content of the web page, the subsequent request comprising policy handling information, and wherein the handler is further operable to determine that a web address comprised in the subsequent request qualifies for a web page loading policy handling in accordance with the policy handling information comprised in the subsequent request.

In a practical situation, the Internet Protocol access point server is either one of a Gateway General Packet Radio Service, GPRS, Support Node and a Packet Data Network Gateway.

The Internet Protocol, IP, access point server may also comprise a processor and a memory, wherein the memory comprising instructions executable by the processor, whereby said IP access point server is operative to perform any of the methods as described above.

In the context of the present invention, a module, device, equipment or the like may also be implemented as a computer program running on the processor.

In a third aspect of the invention, there is provided a method for loading a web page at a user equipment, UE, in a telecommunication network, wherein the telecommunication network comprises an Internet Protocol, IP, access point server and a web server hosting the web page.

The method comprises the steps of transmitting a request, by the UE, to the IP access point server, for loading the web page, receiving, by the UE, web page markup data of the web page and policy handling information relating to the web page, from the IP access point server, generating, by the UE, a subsequent request triggered by the received web page markup data of the web page, in accordance with the policy handling information, and transmitting, by the UE, said subsequent request to the IP access point server, for retrieving content at a web server for loading the web page.

The present invention also relates to a User Equipment, UE, arranged for operation in a telecommunication network, wherein the telecommunication network comprises an Internet Protocol, IP, access point server and a web server hosting the web page, wherein the UE is arranged to perform a method according to the third aspect of the invention.

As such, the invention relates to a method for loading a web page at a web page requester in a telecommunication network, wherein the telecommunication network comprises an Internet Protocol, IP, access point server and a web server hosting said web page.

The method comprises the steps of transmitting a request, by the web page requester, to the IP access point server for loading the web page; receiving, by the web page requester, web page markup data of the web page and policy handling information relating to the web page, from the IP access point server; generating, by the web page requester, a subsequent request triggered by the received web page markup data of the web page, in accordance with the policy handling information; transmitting, by the web page requester, the subsequent request to the IP access point server for retrieving content at a web server for loading the web page.

In an example, the step of generating, by the web page requester, the subsequent request further comprises retrieving a web address from the web page markup data, amending the web address with a prefix, and construing the subsequent request using the amended web address.

The present invention further relates to a web page requester arranged for operation in a telecommunication network, wherein the telecommunication network comprises an Internet Protocol, IP, access point server and a web server hosting the web page, wherein the web page requester is arranged to perform any of the method steps as disclosed above.

The above-mentioned and other features and advantages of the invention will be best understood from the following description referring to the attached drawings. In the drawings, like reference numerals denote identical parts or parts performing an identical or comparable function or operation The invention is not limited to the particular examples disclosed below in connection with a particular type of cellular telecommunication system or network.

DETAILED DESCRIPTION

Figure 1:
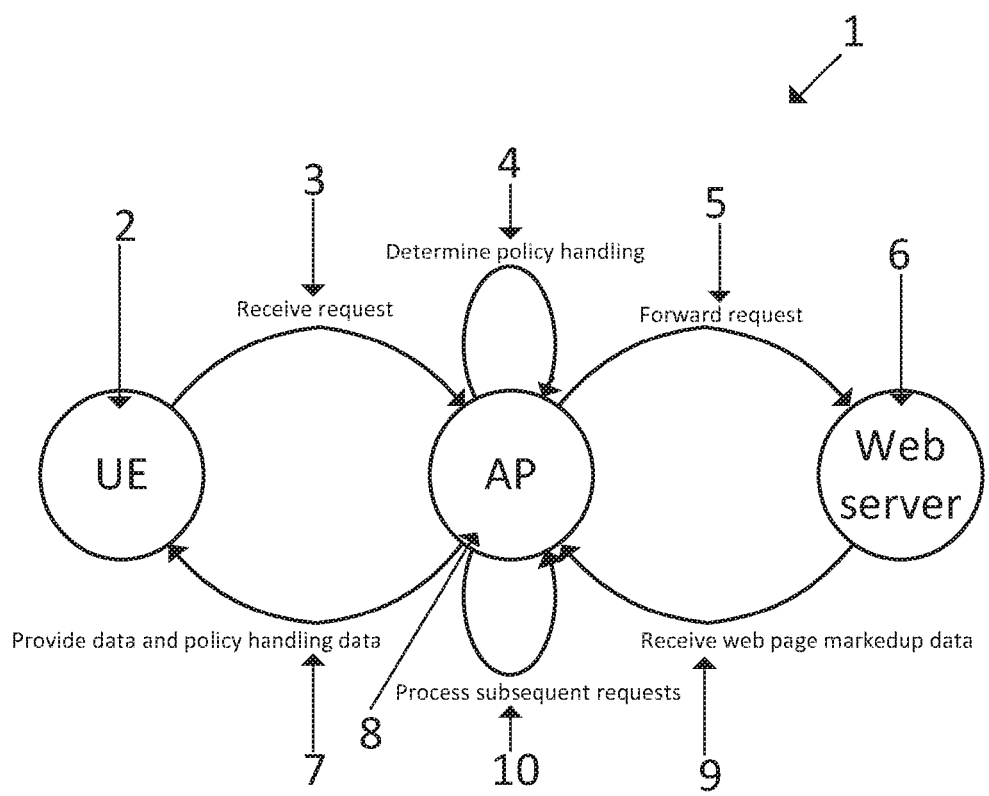
FIG. 1 is a state diagram of an example of a method for loading a web page at a user equipment in a telecommunication system, according to the present invention.

FIG. 1 is a schematic view of an example of a method 1 for loading a web page at a user equipment in a telecommunication system, according to the present invention.

The User Equipment, UE, is indicated with reference numeral 2 and the web server 6 hosting the web page is indicated with reference numeral 6. The User Equipment 2 may be any device suitable for internet access, such as a mobile phone, laptop, tablet, desktop personal computer, etc.

Mobile User Equipment are arranged to obtain Internet Protocol, IP, connectivity through the establishment of a Packet Data Protocol Context, PDPc, in telecommunication networks such as General Packet Radio Service/third Generation, GPRS/3G networks. In Long Term Evolution, LTE, combined with Evolved Packet Core based networks, i.e. Evolved Packet System, EPS, networks, IP connectivity is established through the use of a Data Bearer.

In any case, the IP access point server 8 is a first server in the telecommunication network to which the User Equipment 2 communicates. The IP access point server 8 may be a Gateway General Packet Radio Service, GPRS, Support Node for GPRS/3G telecommunication networks or a Packet Data Gateway Network for EPS telecommunication networks.

User Equipment 2 usually has a single IP access point server 8 configured for internet access and Multimedia Messaging Service, MMS. This has the implication that data traffic for generic internet services and data traffic for MMS is handled in the same PDPc or data bearer. An IP packet that is related to the transfer of an MMS can, however, be treated differently from an IP message that contains another IP protocol, such as Hypertext Transfer Protocol, HTTP.

This differentiation may e.g. be done based on destination or origination web addresses of the IP packets sent by the User Equipment 2. IP packets related to MMS may e.g. be charged differently, or may be exempt from charging when MMS charging is performed at another server in the telecommunication network.

In a first step for loading a web page at the UE 2, the IP access point server 8 receives a request, sent from the UE 2, for loading the web page. Usually, for the loading of a web page, a number of HTTP GET requests are initiated by the page. UE 2. For example, an initial HTTP GET request is received by the IP access point server, 2 for retrieving web page markup data of a web page, such as a "home.html" file. Once the "home.html" file is provided to the UE 1, the UE may generate subsequent HTTP GET requests directed to web addresses comprised in the "home.html" file for also retrieving linked content. Hence, there is generally a large amount of signaling between a UE 2 and a web server 6, such as an HTTP server, for the loading of a HyperText Markup Language, HTML, web page.

If a certain web page qualifies for a web page loading policy handling, for example access to the web page is to be exempt from charging, it is regarded that it is not sufficient to filter on requests comprising a web address of the web page as destination address, i.e. a Request URL for an HTTP GET request, for determining that the web page qualifies for a web page loading policy handling. Reason is that the loading of this web page may comprise subsequent HTTP GET transactions directed to web addresses of other web pages, which web pages should also qualify for a same web page loading policy handling.

A solution to the above sketched problem is presented in that the UE 2 should be provided with the web page markup data received from the web server 6, accompanied with, or comprising, policy handling information. The policy handling information may be a prefix to web addresses comprised in the web page markup data or a parameter indicating that the web addresses qualify for web page loading policy handling.

The policy handling information may either be added to the web page markup data by the web server 6 hosting the web page or by the IP access point server 8.

In case the web server 6 adds the policy handling information to the web page markup data, the IP access point server forwards 5 the received request 3 for loading the web page to the web server 6 along with an indication that the web server should provide the policy handling information to the IP access point server 8.

One principle for the web server 6 to generate the policy handling information is to parse the requested web page, i.e. HTML page, though an "HTML parser". Such a parsing may entail that all URL's embedded in the HTML page are appended with a prefix, i.e. the policy handling information, in case the above mentioned indication is present in the forwarded request 5, resulting in an adapted HTML page. In case no indication is present, the web server 6 will not amend the URL's embedded in the HTML page, i.e. resulting in a non-adapted HTML page.

The parsing of the HTML web page is a process that may be done either online or off-line, and by or on behalf of the web server 6 that hosts the web page.

The IP access point server will then receive the web page markup data 9 from the web server 6, which data comprises the handling information in the form of prefixes to URL's embedded in the HTML page.

It is regarded that the above mentioned principle may require that a secure connection, for example a Virtual Private Network tunnel, is established between the telecommunication network and the web server 6. Such a secure connection is advantageous to guarantee that the web server 6 can authenticate the trustworthiness of the forwarded request 5, i.e. an HTTP GET transaction, comprising the indication for policy handling information.

The IP access point server 8 will then provide, to the UE 2, the web page markup data accompanied with, or comprising, the policy handling information relating to the web page to the UE 2 such that subsequent requests from the UE for retrieving content for loading the web page are in accordance with the policy handling information. Subsequent requests from the UE 2 are directed to web pages having the appended URL, such that the IP access point server is able to determine, based on the prefix of the URL, that the intended web page also qualifies for a web page loading policy handling.

In such a case, for subsequent requests, related to and following an initial request for loading a web page, the IP access point server 8 will process the requests 10 by removing the prefix from the URL, mark the request as being qualified for a web page loading policy handling, and continue with the request in a normal fashion, i.e. forward the request towards the web server 6.

It may not always be practical to generate an adapted HTML web page, as disclosed above, as in such a case, the web server needs to be equipped with additional functionality. Therefore, the policy handling information may, in another embodiment, be included in, or accompanied with the web page markup data provided to the UE 3 by the IP access point server 8.

The IP access point server 8 may, for example, automatically amend URL's embedded in the web page markup data received 9 from the web server 6, before the web page markup data is transferred to the UE 2.

Normally, deep packet inspection (DPI) is performed on IP packets which are sent from a UE 2 towards any server in the telecommunication network. DPI may also be performed on IP packets sent from any server in the telecommunication network, such as the web server 6, towards the UE 2.

A received request 2 for loading a web page, i.e. an HTTP GET requests, by the IP access point server 8, will eventually be followed by a receipt of the web page markup data 9, i.e. an HTTP response message, by the IP access point server 8. The IP access point server 8 may be arranged to correlate incoming HTTP response messages with HTTP GET requests. In case of a match, the IP access point server 8 may decide, for example, to amend URL's embedded in the web page markup data, i.e. comprised in the HTTP response message, with a prefix if a matched HTTP GET request was directed to a web page qualified for a web page loading policy handling.

Another option for the IP access point server 8 is to provide the web page markup data as well as an indication that the URL's embedded in the web page markup data should be amended, to the UE 2. Subsequent requests, triggered by the received web page markup data, need to be amended, by the UE 2, such that the requests are directed to amended URL's, for example URL's with a certain prefix.

Figure 2:
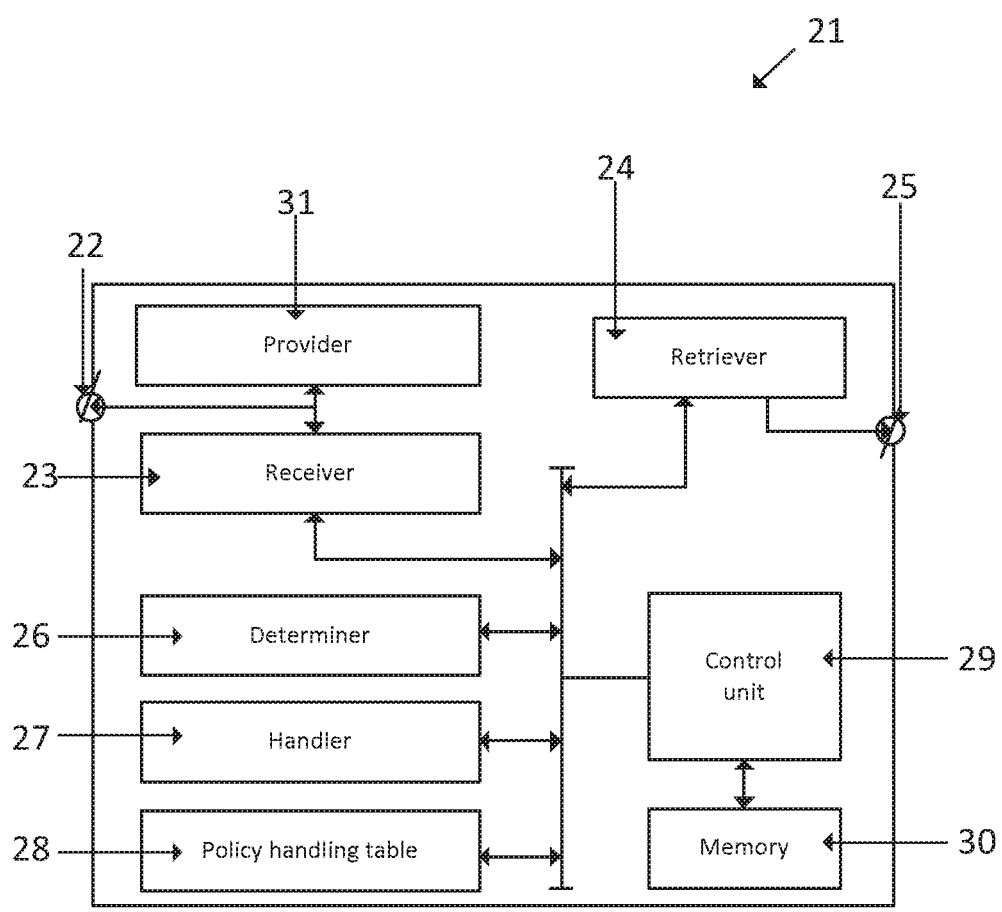
FIG. 2 is a block diagram of an Internet Protocol access point server for operation in a telecommunication network.

FIG. 2 is a schematic view of an Internet Protocol access point server 21 for operation in a telecommunication network.

The IP access point server 21 comprises a memory 30, provider 31, retriever 24, a policy handling table 28, handler 27, determiner 26 and receiver, all connected to a control unit 29, comprising, for example a processor, Field Programmable Gate Array or a micro controller.

The receiver 23 is arranged to receive requests for loading a web page from a User Equipment via its input terminal 22.

The determiner 26 is arranged to determine that the web page qualifies for a web page loading policy handling by matching a web address comprised in the request with entries of a policy handling table 28. Once a match is found, the determiner 26 determines that the web page, or the corresponding request to the web page, qualifies for a web page loading policy handling.

Further, the retriever 24 is arranged to retrieve, via output terminal 25, at a web server hosting the web page, in response to request received from the UE, amended web page markup data relating to the web page instead of the regular web page markup data. The amended web page markup data may be an amended parsed "home.html" file of the web page, wherein the amendments are made to URL's, for example web addresses, comprised in the parsed "home.html" file.

Generally, the above-mentioned request is an HTTP GET request and the response received from the web server, by the receiver 23, is an HTTP response message comprising the web page markup data.

The HTTP response message comprising, for example, the amended parsed "home.html" is then provided to the UE, by the provider 31 via the output terminal 25, such that corresponding, subsequent requests for loading content of a web page, initiated by web addresses comprised in the parsed "home.html" qualify for a web page loading policy handling.

Figure 3:
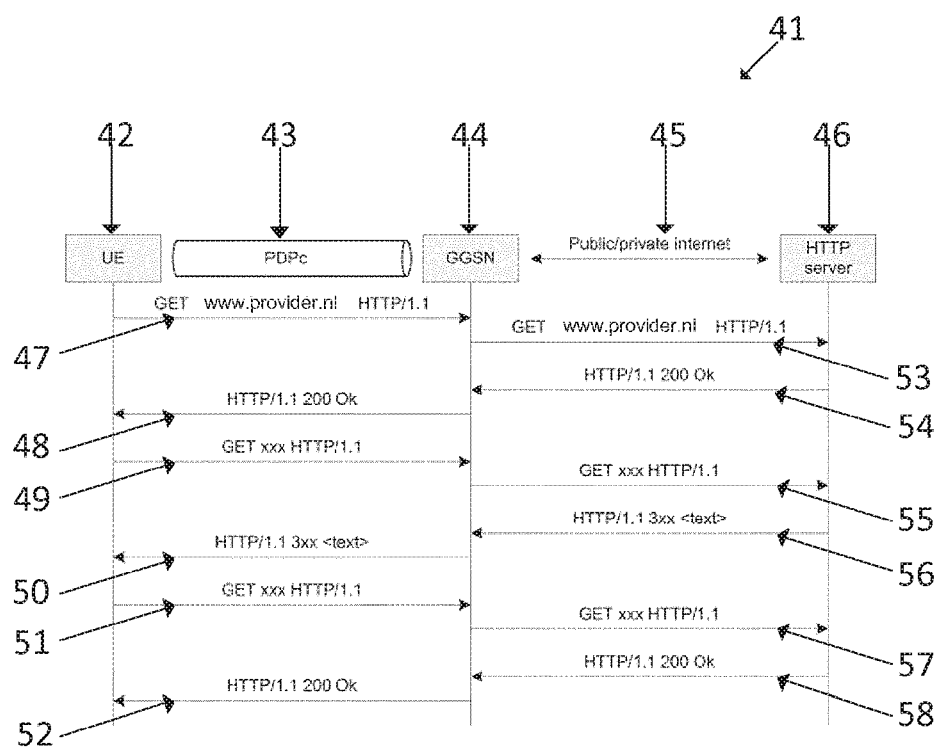
FIG. 3 is a signalling diagram illustrating an aspect of the method according to the present invention.

FIG. 3 is a schematic view illustrating an aspect of the method 41 according to the present invention, wherein it is illustrated that the loading of a web page comprises several requests being sent from the UE 42 to the IP access point server, for example a Gateway GPRS Support Node, GGSN, 44. Here, the UE 42 initiates a request for loading a web page via its associated GGSN 44 towards the web server, for example an HTTP server 46.

As a first step in the process for obtaining IP connectivity for the UE 42, a Packet Data Protocol Context 43, PDPc, is established in the telecommunication network such as a GPRS/3G network between the UE 42 and the serving access point for the UE, i.e. the GGSN 44.

Initially, the UE 42 sends an initial HTTP GET request message 47 for obtaining a parsed HTML page of the website www.provider.nl towards the HTTP server 46, hosting the web page, through the PDPc 43. The request message 47 is received by the GGSN 44, as the GGSN 44 is the first server in the telecommunication network to which the UE 42 communicates, and comprises a Request URI, R-URI, indicating the destination server of the request message 47.

The GGSN 44 is arranged to determine that the received request message 47 qualifies for a web page loading policy handling. To do so, it checks whether the R-URI comprised in the request message 47 meets the requirement for the web page loading policy handling. Such a check may be performed by determining whether the R-URI is present as an entry in a lookup table, which lookup table is stored and maintained by the GGSN 44. An operator of the telecommunication network may decide to update the lookup table in case web addresses of web pages should be added to the lookup table, or should be deleted from the lookup table.

Once it has been determined, by the GGSN 44, that the received request message 47 qualifies for a web page loading policy handling, the GGSN 44 forwards the request message 53 to the HTTP server 46, along with an indication that the HTTP server is to provide the adapted parsed HTML page instead of a regular parsed HTML page.

The HTTP server 46 provides a response message 54 to the request message 53 received, along with the adapted parsed HTML page of the requested web page, i.e. the web page markup data along with the policy handling information relating to the web page. The GGSN 44, receiving such a response message 54, forwards the message 48 to the UE, trusting that the UE will use information embedded in the response for requests derived from the initial HTTP GET request message 47.

In case the adapted parsed HTML page comprises URL to content on other web pages, which content is to be loaded with the requested web page, the UE 42 initiates a further HTTP GET request message 49 for obtaining that content towards the HTTP server 46 hosting that content. In the present example, the HTTP server 46 is the same for hosting the initial requested web page, as for the web pages corresponding to subsequent request messages, i.e. following the initial request message 47.

The GGSN 44, receiving the subsequent HTTP GET request message 49, determines that this message 49 also qualifies for a web page loading policy handling, as the R-URI comprised in that request message 49 is modified according to the policy handling information.

As such, the GGSN 44 forwards the HTTP GET request message 55 towards the HTTP server 46, along with an indication that the HTTP server 46 is to provide the adapted HTML page instead of a regular HTML page.

The response to the HTTP GET request message 55, i.e. the response message 56 is received by the GGSN 44, and forwarded to the UE 42, such that even further subsequent requests initiated by the UE 42 will be treated as qualified for a web page loading policy handling.

In a very similar fashion, the steps indicated with reference numeral 51, 57, 58 and 52, perform a same procedure as explained above, and are included to illustrate that the loading of a web page may comprise of several HTTP GET request messages, which are initiated subsequently.

Figure 4:
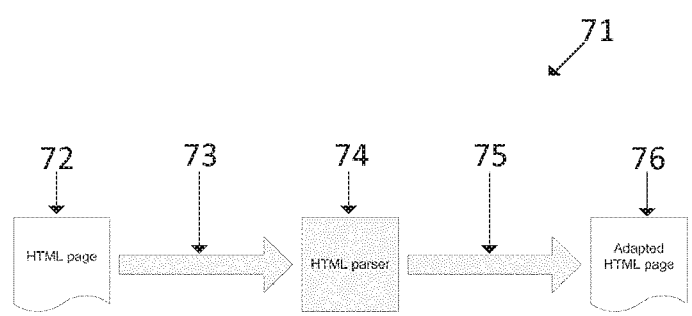
FIG. 4 is a block diagram of a method for parsing a HTML web page such that an adapted HTML page is provided.

FIG. 4 is a schematic view of a method for parsing 71 an HTML web page 72 such that an adapted HTML page 74 is provided.

The HTML parsing process renders an HTML file, i.e. an adapted HTML page 76, which comprises URLs pointing to a single or a limited set of normalized URL's. The HTTP client, i.e. the UE, may build the requested web page as usual, including the initiation of subsequent HTTP GET transactions, for obtaining linked content. These subsequent HTTP GET transactions are sent towards the normalized URL, or to one of the set of normalized URLs, as applicable.

The HTML page 72 is provided 73 to an HTML parser 74. The HTML parser 74 may either parse the HTML page 72 in a normal fashion, i.e. leaving the content of the web page intact, or may parse the HTML page including amending the URL's comprised in the web page with, for example, a prefix. In any case, the parsed HTML page is delivered 75 to the HTTP server, such that the HTTP server is able to provide the HTML page when requested for.

Figure 5:
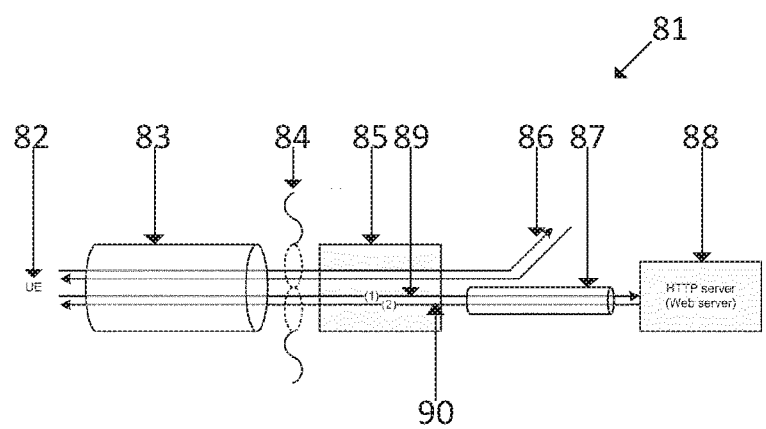
FIG. 5 is a schematic view of a Gateway General Packet Radio Service, GPRS, Support Node handling communication to and from a web server.

FIG. 5 is a schematic view of a Gateway General Packet Radio Service, GPRS, Support Node 85 handling communication to and from a web server 88, illustrating the functionality that the GPRS Support Node 85 receives web page markup data from the web server 88, and correlates the data with the request applied at the web server 88, and, in case of a match, include the policy handling information in the web page markup data to be provided to the UE 82.

When the GGSN 85 has determined that an HTTP GET request is sent towards such URL for which adapted handling is needed, the GGSN marks this transaction as "requiring processing". In case the GGSN receives a response for this HTPP GET transaction, in the present TCP socket 84, for the present PDPc 83, it applies the ad hoc URL adaptation. In this manner, HTTP access to regular web pages is not affected.

Reference numeral 89 indicates that the GGSN receives an HTTP GET request, and that it determines that the HTTP GET request comprises a URL for which a web page loading policy handling is to be applied, i.e. a differentiated handling is needed. The URL may be "the original URL", such as "www.provder.nl" or may be a URL that is adapted due to the differentiated handling of a previous HTTP GET transaction, such as "www.webserver.nl" (not displayed).

Such a differentiated handling comprises, for example, exempting an IP packet from charging and adapting the URLs in the GET response message. For the purpose of the second aspect, the GGSN marks this GET transaction, for this PDP Context 83, as 'requiring special processing'. Reference numeral 90 indicates that the GGSN 85 receives the response for the HTTP GET transaction. The GGSN 85 processes the HTTP GET response(s) as described above. The UE 82 may send additional HTTP transactions over the TCP socket 84 through which this GET transaction is run.

Figure 6:
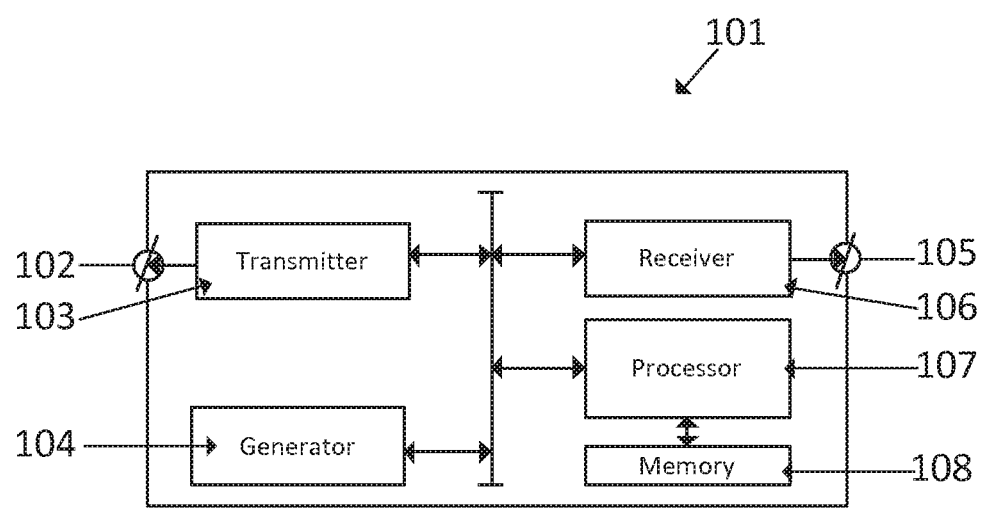
FIG. 6 is a block diagram of a User Equipment arranged for generating requests for loading a web page.

FIG. 6 is a schematic view of a User Equipment, UE, 101 arranged for operating in a telecommunication network and arranged for generating requests for loading a web page.

In a first step, a generator 104 comprised in the UE 101 is arranged to generate an initial request for loading a web page at the UE 101. The initial request may be, for example, an HTTP GET Request directed to a web server hosting the web page. The transmitter 102 is arranged to transmit the request, via output terminal 102, towards an Internet Protocol access point server, which access point server serves as the primary access point for connecting the UE 101 to the telecommunication network.

After performing several subsequent steps, the access point server is arranged to provide web page markup data of the web page along with policy handling information to the UE 101. The policy handling information is, for example, an indication to the UE 101 that the subsequent requests, triggered by the received web page markup data need to be amended. These amendments are performed to make sure that the IP access point server is able to recognize that the subsequent request is initiated, i.e. triggered, by the initial request.

The receiver 106 is arranged to receive the web page markup data and the policy handling information from the IP access point server via input terminal 105. Once received, the generator 104 will generate a subsequent request, triggered by the received web page markup data, in accordance with the policy handling information. The subsequent request is then sent by the transmitter 102, using output terminal 102, to the IP access point server for loading linked content of the web page.

The advantage of an embodiment according to the invention is that no constraints are imposed on the design of a web page, such as the number of embedded links, whether or not the web page may be dynamically altered, etc. As long as the policy handling information is provided to the UE, the IP access point server is able to determine that subsequent requests qualify for the same policy handling, irrespective of the design of the web page.

Another advantage according to another embodiment of the invention is that the functionality of subsequent servers or nodes in the chain, i.e. between the IP access point server and the web server, does not need to be altered, in the case that the IP access point server amend the subsequent request by removing the policy handling information.

Another advantage is that the web server does not need to be modified to enable a method according the present invention, at least In the case that the characterizing aspects of the invention are performed by the IP access point server.

The present invention is not limited to the embodiments as disclosed above, and can be modified and enhanced by those skilled in the art beyond the scope of the present invention as disclosed in the appended claims without having to apply inventive skills.

What is claimed is:

1. A method, implemented by an Internet Protocol access point, the method comprising:
   sending, to a requesting device, a modified version of a first web page comprising first modifications made in accordance with policy handling information;
   receiving, from the requesting device, a request for a second web page; and
   responsive to detecting that the request for the second web page comprises one or more of the first modifications, sending a modified version of the second web page comprising second modifications made in accordance with the policy handling information to the requesting device;
   wherein detecting that the request for the second web page comprises one or more of the first modifications comprises detecting that a web address comprised in the request comprises a prefix indicating that the policy handling information is relevant to the request.

2. The method of claim 1, further comprising:
   retrieving the first and second web pages from a remote web server;
   modifying the first and second web pages to respectively generate the modified versions of the first and second web pages.

3. The method of claim 1, wherein a remote web server hosts the modified versions of the first and second web pages and unmodified versions of the first and second web pages, the method further comprising selecting between the modified and unmodified versions of the first and second web pages to send to the requesting device.

4. The method of claim 1, further comprising, responsive to detecting that the request for the second web page comprises one or more of the first modifications, removing the one or more of the first modifications from the request and forwarding the request with the one or more of the first modifications removed towards a web server hosting the second web page.

5. The method of claim 1, further comprising:
   modifying a request for the first web page in accordance with the policy handling information;
   forwarding the modified request to a web server hosting the first web page and receiving the modified version of the first web page in response.

6. An Internet Protocol (IP) access point server comprising:
   communication circuitry and processing circuitry communicatively coupled to the communication circuitry, wherein the processing circuitry is configured to:
   send, to a requesting device via the communication circuitry, a modified version of a first web page comprising first modifications made in accordance with policy handling information;
   receive, from the requesting device via the communication circuitry, a request for a second web page; and
   responsive to detecting that the request for the second web page comprises one or more of the first modifications, send a modified version of the second web page comprising second modifications made in accordance with the policy handling information to the requesting device via the communication circuitry;
   wherein to detect that the request for the second web page comprises one or more of the first modifications the processing circuitry is configured to detect that a web address comprised in the request comprises a prefix indicating that the policy handling information is relevant to the request.

7. The IP access point of claim 6, wherein the processing circuitry is further configured to:
   retrieve the first and second web pages from a remote web server via the communication circuitry;
   modify the first and second web pages to respectively generate the modified versions of the first and second web pages.

8. The IP access point of claim 6, wherein:
   a remote web server hosts the modified versions of the first and second web pages and unmodified versions of the first and second web pages;
   the processing circuitry is further configured to select between the modified and unmodified versions of the first and second web pages to send to the requesting device.

9. The IP access point of claim 6, wherein the processing circuitry is further configured to, responsive to detecting that the request for the second web page comprises one or more of the first modifications, remove the one or more of the first modifications from the request and forward the request with the one or more of the first modifications removed towards a web server hosting the second web page via the communication circuitry.

10. The IP access point of claim 6, wherein the processing circuitry is further configured to:
    modify a request for the first web page in accordance with the policy handling information;
    forward the modified request via the communication circuitry to a web server hosting the first web page and receive the modified version of the first web page via the communication circuitry in response.

11. A non-transitory computer readable medium storing instructions for controlling a programmable Internet Protocol (IP) access point, wherein the instructions, when run on processing circuitry of the programmable IP access point, cause the programmable IP access point to:
    send, to a requesting device, a modified version of a first web page comprising first modifications made in accordance with policy handling information;
    receive, from the requesting device, a request for a second web page;
    responsive to detecting that the request for the second web page comprises one or more of the first modifications, send a modified version of the second web page comprising second modifications made in accordance with the policy handling information to the requesting device;
    wherein to detect that the request for the second web page comprises one or more of the first modifications, the instructions cause the programmable IP access point to detect that a web address comprised in the request comprises a prefix indicating that the policy handling information is relevant to the request.

12. The non-transitory computer readable medium of claim 11, wherein the instructions further cause the programmable IP access point to:

retrieve the first and second web pages from a remote web server;

modify the first and second web pages to respectively generate the modified versions of the first and second web pages.

13. The non-transitory computer readable medium of claim 11, wherein a remote web server hosts the modified versions of the first and second web pages and unmodified versions of the first and second web pages and the instructions further cause the programmable IP access point to select between the modified and unmodified versions of the first and second web pages to send to the requesting device.

14. The non-transitory computer readable medium of claim 11, wherein the instructions further cause the programmable IP access point to, responsive to detecting that the request for the second web page comprises one or more of the first modifications, remove the one or more of the first modifications from the request and forward the request with the one or more of the first modifications removed towards a web server hosting the second web page.

15. The non-transitory computer readable medium of claim 11, wherein the instructions further cause the programmable IP access point to:

modify a request for the first web page in accordance with the policy handling information;

forward the modified request to a web server hosting the first web page and receive the modified version of the first web page in response.

16. A method, implemented by an Internet Protocol access point, the method comprising:

sending, to a requesting device, a modified version of a first web page comprising first modifications made in accordance with policy handling information;

receiving, from the requesting device, a request for a second web page; and responsive to detecting that the request for the second web page comprises one or more of the first modifications:

removing the one or more of the first modifications from the request and forwarding the request with the one or more of the first modifications removed towards a web server hosting the second web page; and sending a modified version of the second web page comprising second modifications made in accordance with the policy handling information to the requesting device.

17. The method of claim 16, further comprising:

retrieving the first and second web pages from the web server;

modifying the first and second web pages to respectively generate the modified versions of the first and second web pages.

18. The method of claim 16, further comprising:

modifying a request for the first web page in accordance with the policy handling information;

forwarding the modified request to a web server hosting the first web page and receiving the modified version of the first web page in response.

19. An Internet Protocol (IP) access point server comprising:

communication circuitry and processing circuitry communicatively coupled to the communication circuitry, wherein the processing circuitry is configured to:

send, to a requesting device via the communication circuitry, a modified version of a first web page comprising first modifications made in accordance with policy handling information;

receive, from the requesting device via the communication circuitry, a request for a second web page; and responsive to detecting that the request for the second web page comprises one or more of the first modifications:

remove the one or more of the first modifications from the request and forward the request with the one or more of the first modifications removed towards a web server hosting the second web page via the communication circuitry; and send a modified version of the second web page comprising second modifications made in accordance with the policy handling information to the requesting device via the communication circuitry.

20. The IP access point of claim 19, wherein the processing circuitry is further configured to:

retrieve the first and second web pages from the web server via the communication circuitry;

modify the first and second web pages to respectively generate the modified versions of the first and second web pages.

21. The IP access point of claim 19, wherein the processing circuitry is further configured to:

modify a request for the first web page in accordance with the policy handling information;

forward the modified request via the communication circuitry to a web server hosting the first web page and receive the modified version of the first web page via the communication circuitry in response.

22. A non-transitory computer readable medium storing instructions for controlling a programmable Internet Protocol (IP) access point, wherein the instructions, when run on processing circuitry of the programmable IP access point, cause the programmable IP access point to:

send, to a requesting device, a modified version of a first web page comprising first modifications made in accordance with policy handling information;

receive, from the requesting device, a request for a second web page;

responsive to detecting that the request for the second web page comprises one or more of the first modifications:

remove the one or more of the first modifications from the request and forward the request with the one or more of the first modifications removed towards a web server hosting the second web page;

send a modified version of the second web page comprising second modifications made in accordance with the policy handling information to the requesting device.

23. The non-transitory computer readable medium of claim 22, wherein the instructions further cause the programmable IP access point to:

retrieve the first and second web pages from the web server;

modify the first and second web pages to respectively generate the modified versions of the first and second web pages.

24. The non-transitory computer readable medium of claim 22, wherein the instructions further cause the programmable IP access point to:

modify a request for the first web page in accordance with the policy handling information;

forward the modified request to a web server hosting the first web page and receive the modified version of the first web page in response.

* * * * *